(12) United States Patent
Andersen

(10) Patent No.: US 9,047,860 B2
(45) Date of Patent: Jun. 2, 2015

(54) METHOD FOR CONCATENATING FRAMES IN COMMUNICATION SYSTEM

(75) Inventor: Soren Andersen, Aalborg (DK)

(73) Assignee: SKYPE, Dublin (IE)

( * ) Notice: Subject to any disclaimer, the term of this patent is extended or adjusted under 35 U.S.C. 154(b) by 1415 days.

(21) Appl. No.: 11/883,440

(22) PCT Filed: Jan. 31, 2006

(86) PCT No.: PCT/DK2006/000055
§ 371 (c)(1),
(2), (4) Date: Mar. 7, 2008

(87) PCT Pub. No.: WO2006/079350
PCT Pub. Date: Aug. 3, 2006

(65) Prior Publication Data
US 2008/0154584 A1    Jun. 26, 2008

(30) Foreign Application Priority Data
Jan. 31, 2005 (DK) .......................... PA 2005 00145

(51) Int. Cl.
*G10L 19/005* (2013.01)
*G10L 19/24* (2013.01)
*G10L 19/26* (2013.01)

(52) U.S. Cl.
CPC ............... *G10L 19/005* (2013.01); *G10L 19/26* (2013.01); *G10L 19/24* (2013.01)

(58) Field of Classification Search
CPC ............... G06F 17/20; G06F 17/27–17/2765; G10L 19/00–19/005; G10L 19/008–19/24; G10L 19/26–19/265; G10L 25/00–25/93; G10L 2021/02–2021/0575
USPC .......... 704/200–218, 220, E19.001–E19.049, 704/E21.001–E21.02, 200–218; 379/414–417, 900–901; 375/237–239, 375/242–254
See application file for complete search history.

(56) References Cited

U.S. PATENT DOCUMENTS 4,516,259 A * 5/1985 Yato et al. ...................... 704/220
4,591,909 A * 5/1986 Kuroda et al. ............ 375/240.12
(Continued)

FOREIGN PATENT DOCUMENTS

EP    1 278 353    1/2003
EP    1 288 916    3/2003
(Continued)

OTHER PUBLICATIONS

IEEE Standard Dictionary of Electrical and Electronics Terms. IEEE: 1996. Ed: Jane Radatz. p. 24.*
(Continued)

*Primary Examiner* — Pierre-Louis Desir
*Assistant Examiner* — David Kovacek
(74) *Attorney, Agent, or Firm* — Sonia Cooper; Jim Ross; Micky Minhas

(57) ABSTRACT

A method for concatenating a first frame of samples and a subsequent second frame of samples, the method comprising applying a phase filter adapted to minimizing a discontinuity at a boundary between the first and second frames of samples.

27 Claims, 8 Drawing Sheets

(56) References Cited

U.S. PATENT DOCUMENTS

| | | | |
|---|---|---|---|
| 4,811,361 A * | 3/1989 | Bacou et al. | 375/242 |
| 5,007,094 A * | 4/1991 | Hsueh et al. | 704/226 |
| 5,371,853 A * | 12/1994 | Kao et al. | 704/200.1 |
| 5,581,652 A * | 12/1996 | Abe et al. | 704/222 |
| 5,602,959 A * | 2/1997 | Bergstrom et al. | 704/205 |
| 5,699,481 A | 12/1997 | Shlomot et al. | |
| 5,757,858 A * | 5/1998 | Black et al. | 375/295 |
| 5,806,037 A * | 9/1998 | Sogo | 704/268 |
| 5,890,108 A * | 3/1999 | Yeldener | 704/208 |
| 5,909,663 A | 6/1999 | Iijima et al. | |
| 6,028,890 A * | 2/2000 | Salami et al. | 375/216 |
| 6,292,454 B1 | 9/2001 | Hu | |
| 6,311,153 B1 * | 10/2001 | Nakatoh et al. | 704/216 |
| 6,415,253 B1 * | 7/2002 | Johnson | 704/210 |
| 6,418,408 B1 * | 7/2002 | Udaya Bhaskar et al. | 704/219 |
| 6,456,964 B2 * | 9/2002 | Manjunath et al. | 704/205 |
| 6,487,535 B1 | 11/2002 | Smyth et al. | |
| 6,661,842 B1 * | 12/2003 | Abousleman | 375/240.11 |
| 6,661,843 B2 | 12/2003 | Kato et al. | |
| 6,691,082 B1 * | 2/2004 | Aguilar et al. | 704/219 |
| 6,766,300 B1 | 7/2004 | Laroche | |
| 6,895,375 B2 * | 5/2005 | Malah et al. | 704/219 |
| 6,931,370 B1 * | 8/2005 | McDowell | 704/200.1 |
| 7,117,156 B1 * | 10/2006 | Kapilow | 704/267 |
| 7,356,748 B2 * | 4/2008 | Taleb | 714/746 |
| 7,590,525 B2 | 9/2009 | Chen | |
| 7,711,563 B2 | 5/2010 | Chen | |
| 7,895,046 B2 * | 2/2011 | Andersen et al. | 704/503 |
| 8,918,196 B2 | 12/2014 | Andersen | |
| 2001/0023396 A1 * | 9/2001 | Gersho et al. | 704/220 |
| 2002/0133764 A1 | 9/2002 | Wang | |
| 2002/0143526 A1 | 10/2002 | Coorman et al. | |
| 2002/0173949 A1 * | 11/2002 | Gigi | 704/201 |
| 2003/0078769 A1 * | 4/2003 | Chen | 704/211 |
| 2003/0167170 A1 | 9/2003 | Andrsen et al. | |
| 2003/0202528 A1 | 10/2003 | Eckberg | |
| 2004/0002856 A1 * | 1/2004 | Bhaskar et al. | 704/219 |
| 2004/0064307 A1 * | 4/2004 | Scalart et al. | 704/205 |
| 2004/0122662 A1 | 6/2004 | Crockett | |
| 2004/0136448 A1 * | 7/2004 | Miller | 375/222 |
| 2005/0007952 A1 | 1/2005 | Scott | |
| 2005/0031097 A1 * | 2/2005 | Rabenko et al. | 379/93.31 |
| 2005/0154584 A1 * | 7/2005 | Jelinek et al. | 704/219 |
| 2005/0187759 A1 * | 8/2005 | Malah et al. | 704/200 |
| 2006/0047521 A1 * | 3/2006 | Feng et al. | 704/500 |
| 2006/0093038 A1 * | 5/2006 | Boyce | 375/240.16 |
| 2006/0149532 A1 * | 7/2006 | Boillot et al. | 704/203 |
| 2006/0153286 A1 * | 7/2006 | Andersen et al. | 375/229 |
| 2008/0154584 A1 * | 6/2008 | Andersen | 704/211 |
| 2008/0275580 A1 * | 11/2008 | Andersen | 700/94 |
| 2010/0161086 A1 * | 6/2010 | Andersen | 700/94 |
| 2012/0158163 A1 | 6/2012 | Andersen | |

FOREIGN PATENT DOCUMENTS

| | | |
|---|---|---|
| JP | H10-209977 A | 8/1998 |
| JP | 2001-142477 | 5/2001 |
| JP | 2002-328691 A | 11/2002 |
| JP | 2002542517 | 12/2002 |
| JP | 2002542521 | 12/2002 |
| JP | 2003514473 | 4/2003 |
| JP | 2003-316670 A | 11/2003 |
| JP | 2004-501391 A | 1/2004 |
| JP | 2004-077961 A | 3/2004 |
| JP | 2005012350 | 1/2005 |
| JP | 2005315973 | 11/2005 |
| WO | WO 94/29850 | 12/1994 |
| WO | WO 00/63881 | 10/2000 |
| WO | WO-0063885 | 10/2000 |
| WO | WO-0137265 | 5/2001 |
| WO | WO 01/48736 | 7/2001 |
| WO | 02/071389 A1 | 9/2002 |
| WO | 02/095731 A1 | 11/2002 |
| WO | WO 03/102921 | 11/2003 |
| WO | WO 2004102531 | 11/2004 |
| WO | WO 2006/079348 | 8/2006 |
| WO | WO 2006/079349 | 8/2006 |
| WO | WO 2006/079350 | 8/2006 |

OTHER PUBLICATIONS

Decision on Grant, Patent for Invention dated Oct. 11, 2010 issued in corresponding Russian Application No. 2007132735/09 and English translation thereof.

English abstract of RU 2000102555.

'Pulse Code Modulation (PCM) of Voice Frequencies Appendix I; A High Quality Low-Complexity Algorithm for Packet Loss Concealment With G.711' ITU-T Recommendations, International Telecommendation Union, Geneva, CH, vol. G.711, 1999-09, pp. I-III,1.

Valenzuela R A et al: A New Voice-Packet Reconstruction Technique, Speech Processing 2, Digital Signal Processing. Glasgow, May 23-26, 1989, International Conference on Acoustics, Speech&Signal Processing ICASSP, New York, IEEE, US, vol. Vol. 2 Conf.14, May 23 1989 pp. 1334-1336, XP000090346.

Elsabrouty M et al: Receiver-based packet loss concealment for pulse code modulation (PCM G. 711)coder Signal Processing, Elsevier Science Publishers B.V. Amsterdam, NL, vol. 84, No. 3 Mar. 2004 pp. 663-667, XP004487961.

Office Action dated Feb. 7, 2011 issued in related U.S. Appl. No. 11/883,427.

ITU-T Recommendation G.729—"Coding of speech at 8 kbit/s using conjugate-structure algebraic-code-excited linear prediction (CS-ACELP)" (Mar. 1996).

Yi J. Liang et al., "Adaptive Playout Scheduling and Loss Concealment for Voice Communication over IP Networks", *IEEE Trans. On Multimedia*, vol. 5, No. 4, pp. 532-543 (Dec. 2003).

S. Andersen, et al., Internet Engineering Task Force Request for Comments 3951, *The Internet Society* (Dec. 2004).

Christoffer Asgaard Rodbro et al., "Time Scaling of Sinusoids for Intelligent Jitter Buffer in Packet Based Telephony", IEEE Proc. Workshop on Speech Coding, pp. 71-73 (2002).

Robert Brennan et al., "An Ultra Low-Power DSP System with a Flexible Filterbank", *IEEE*, Conf. Record of 35th Asilomar Conf. on Signals, Systems & Computers, Pacific Grove, CA, Nov. 4-7, 2001. vol. 1 of 2, pp. 809-813.

David J. Goodman et al., "Waveform Substitution Techniques for Recovering Missing Speech Segments in Packet Voice Communications", *IEEE Trans. On Acoustics, Speech & Signal Proc.*, vol. ASSP-34, No. 6, pp. 1440-1448 (Dec. 1986).

International Search Report: PCT/DK2006/000053 PCT/ISA/210, Date of Mailing: May 4, 2006, (4054.1171-000), 3 pp.

International Preliminary Report on Patentability PCT/IPEA/409, Apr. 2005, PCT/DK2006/000053, Date of Completion of Report: May 21, 2007, (4054.1171-000), 11 pp.

Written Opinion of the International Searching Authority PCT/ISA/237, PCT/DK2006/000053, May 21, 2007, (4054.1171-000), 6 pp.

International Search Report and Written Opinion, PCT/DK2006/000054, Date of Mailing: May 4, 2006, (4054.1172-000), 8 pp.

Office Action mailed Mar. 30, 2011 in co-pending U.S. Appl. No. 11/883,430.

"Foreign Office Action", JP Application No. 2007-552505, (May 22, 2012), 5 pages.

"Foreign Office Action", AU Application No. 2006208530, (Oct. 18, 2010), 3 pages.

"Foreign Office Action", CA Application No. 2,596,337, (Oct. 15, 2012), 2 pages.

"Foreign Office Action", CA Application No. 2,596,337, (Dec. 5, 2011), 4 pages.

"Foreign Notice of Allowance", CN Application No. 200680003571.4, (Nov. 28, 2012), 3 pages.

"Foreign Office Action", KR Application No. 10-2007-7020042, (Apr. 24, 2012), 6 pages.

"Foreign Office Action", KR Application No. 10-2007-7020043, (Mar. 29, 2012), 10 pages.

"Foreign Office Action", CA Application No. 2,596,341, (Jun. 18, 2012), 3 pages.

(56) References Cited

OTHER PUBLICATIONS

"Foreign Office Action", KR Application No. 10-2007-7020044, (Apr. 25, 2012), 10 pages.
"Advisory Action", U.S. Appl. No. 11/883,430, (Jan. 18, 2012), 3 pages.
"Final Office Action", U.S. Appl. No. 11/883,430, (Nov. 2, 2011), 11 pages.
"Final Office Action", U.S. Appl. No. 11/883,440, (Oct. 25, 2011), 26 pages.
"International Preliminary Report on Patentability", Application No. PCT/DK2006/000055, (Apr. 3, 2007), 10 pages.
"Non-Final Office Action", U.S. Appl. No. 11/883,440, (Apr. 18, 2011), 19 pages.
"Notice of Allowance", U.S. Appl. No. 11/883,427, (Jul. 21, 2011), 5 pages.
"Notice of Allowance Issued in Canadian Patent Application No. 2596337", Mailed Date: Apr. 14, 2014, Filed Date: Jan. 31, 2006, 1 Page. (MS# 335848.05).
"Notice of Allowance Issued in Japanese Patent Application No. 2007-552505", Mailed Date: Oct. 22, 2013, Filed Date: Jan. 31, 2006, 3 Pages. (MS# 335848.10) (w/o English Translation).
"Notice of Allowance Issued in Canadian Patent Application No. 2596338", Mailed Date: Feb. 12, 2014, Filed Date: Jan. 31, 2006, 1 Page. (MS# 335848.22).
"Office Action Issued in Israel Patent Application No. 184927", Mailed Date: Nov. 25, 2013, Filed Date: Jan. 31, 2006, 6 Pages. (MS# 335848.27).
"Notice of Allowance Issued in US Appl. No. 11/883,430" Mailed Date: Jun. 17, 2014, 4 pages.
"Non-Final Office Action", U.S. Appl. No. 11/883,430, filed Dec. 17, 2013, 12 pages.
"Foreign Office Action", JP Application No. 2007-552505, Oct. 16, 2012, 6 pages.
"Notice of Allowance", U.S. Appl. No. 11/883,430, filed Aug. 27, 2014, 4 pages.
"Foreign Office Action", JP Application No. 2013-198241, Jul. 15, 2014, 6 pages.
"Supplemental Notice of Allowance", U.S. Appl. No. 11/883,430, filed Nov. 21, 2014, 2 pages.

\* cited by examiner

METHOD FOR CONCATENATING FRAMES IN COMMUNICATION SYSTEM

FIELD OF THE INVENTION

The present invention relates to telecommunication systems. More particularly, the present invention relates to a method, a device, and an arrangement that mitigates discontinuities that occur when frames relating to non-consecutive frames in an original audio signal, or when one or both frames relate to a concealment method, are concatenated. This happens in particular in connection with loss and/or delay jitter and/or clock skew of signal packets. The invention improves the quality of signal transmission over wireless telecommunication systems and packet switched networks.

BACKGROUND OF THE INVENTION

Modern telecommunications are based on digital transmission of signals. For example, in FIG. 1, a transmitter 200 collects a sound signal from a source 100. This source can be the result of one or more persons speaking and other acoustic wave sources collected by a microphone, or it can be a sound signal storage or generation system such as a text-to-speech synthesis or dialog system. If the source signal is analog it is converted to a digital representation by means of an analog-to-digital converter. The digital representation is subsequently encoded and placed in packets following a format suitable for the digital channel 300. The packets are transmitted over the digital channel. The digital channel typically comprises multiple layers of abstraction.

At the layer of abstraction in FIG. 1, the digital channel takes a sequence of packets as input and delivers a sequence of packets as output. Due to degradations in the channel, typically caused in noise, imperfections, and overload in the channel, the output packet sequence is typically contaminated with loss of some of the packets and arrival time delay and delay jitter for other packets. Furthermore, difference in clock of the transmitter and the receiver can result in clock skew. It is the task of the receiver 400 to decode the received data packets and to convert the decoded digital representations from the packet stream and decode this into digital signal representations and further convert these representations into a decoded sound signal in a format suitable for output to the signal sink 500. This signal sink can be one or more persons who are presented the decoded sound signal by means of, e.g., one or more loudspeakers. Alternatively, the signal sink can be a speech or audio storage system or a speech or audio dialog system or recognizer.

It is the task of the receiver to accurately reproduce a signal that can be presented to the sink. When the sink directly or indirectly comprises human listeners, an object of the receiver is to obtain a representation of the sound signal that, when presented to the human listeners, accurately reproduces the humanly perceived impression and information of the acoustic signal from the source or sources. To secure this task in the common case where the channel degrades the received sequence of packets with loss, delay, delay jitter, and clock skew may furthermore be present, an efficient concealment is necessary as part of the receiver subsystem.

As an example, one possible implementation of a receiver subsystem to accomplish this task is illustrated in FIG. 2. As indicated in this figure, incoming packets are stored in a jitter buffer 410 from where a decoding and concealment unit 420 acquires received encoded signal representations, and decodes and conceals these encoded signal representations to obtain signal representations suitable for storage in a playout buffer 430 and subsequent playout. The control of when to initiate concealment and what specific parameters of this concealment, such as length of the concealed signal, can, as an example, be carried out by a control unit 440, which monitors the contents of the jitter buffer and the playout buffer and controls the action of the decoding and concealment unit 420.

Concealment can also be accomplished as part of a channel subsystem. FIG. 3 illustrates one example of a channel subsystem in which packets are forwarded from a channel 310 to a channel 330 via a subsystem 320, which we for later reference term the relay. In practical systems the relay function may be accomplished by units, which may take a variety of context dependent names, such as diverse types of routers, proxy servers, edge servers, network access controllers, wireless local area network controllers, Voice-over-IP gateways, media gateways, unlicensed network controllers, and other names. In the present context all these as examples of relay systems.

One example of a relay system that is able to do audio concealment is illustrated in FIG. 4. As illustrated in this figure, packets are forwarded from an input buffer 310 to an output buffer 360 via packet switching subsystems 320 and 350. The control unit 370 monitors the input and output buffers, and as a result of this monitoring, makes decisions if transcoding and concealment is necessary. If this is the case, the switches direct the packets via the transcoding and concealment unit 330. If this is not the case, the switches directs the packets via the minimal protocol action subsystem 340, which will make a minimum of operations on the packet headers to remain compliant with applied protocols. This can comprise steps of altering sequence number and time-stamp of the packets.

In transmission of audio signals using systems exemplified by, but not limited to, the above descriptions, there is the need for concealment of loss, delay, delay jitter, and/or clock skew in signals representative, or partially representative, of the sound signal.

Pitch repetition methods, sometimes embodied in the oscillator model, are based in an estimate of the pitch period in voiced speech, or alternatively in the estimation of the corresponding fundamental frequency of the voiced speech signal. Given the pitch period, a concealment frame is obtained by repeated readout of the last pitch period. Discontinuities at the beginning and end of the concealment frame and between each repetition of the pitch period can be smoothed using a windowed overlap-add procedure. See patent number WO 0148736 and International Telecommunications Union recommendation ITU-T G.711 Appendix 1 for examples of the pitch repetition method. Prior art systems integrate pitch repetition based concealment with decoders based in the linear predictive coding principle. In these systems the pitch repetition is typically accomplished in the linear predictive excitation domain by a read out from the long-term predictor or adaptive codebook loop. See U.S. Pat. No. 5,699,481, International Telecommunications Union recommendation ITU-T G.729, and Internet Engineering Task Force Request For Comments 3951 for examples of pitch repetition based concealment in the linear predictive excitation domain. The above methods apply for concealing a loss or an increasing delay, i.e., a positive delay jitter, and situations of input or jitter buffer underflow or near underflow e.g. due to clock skew. To conceal a decreasing delay, a negative delay jitter, or an input or jitter buffer overflow or near overflow, the generation of a shortened concealment signal is needed. Pitch based methods accomplish this by an overlap add procedure between a pitch period and an earlier pitch period. See patent number WO 0148736 for an example of this method. Again this can be accomplished while exploiting facilities present in linear predictive decoders. As an example, U.S. Pat. No. 5,699,481 discloses a method by which fixed codebook contribution vectors are simply discarded from the reproduction signal, relying on the state of the adaptive codebook to secure pitch periodicity in the reproduced signal. In connection with pitch repetition methods one object is a seamless signal continuation from the concealment frame to the next frame. Patent no. WO 0148736 discloses a method to achieve this object. By the invention disclosed in WO 0148736 this object is achieved by means of concealment frames of time varying and possibly signal dependent length. Whereas this efficiently can secure seamless signal continuation in connection with concealment of delay jitter and clock skew, this solution introduce a deficiency in connection with systems of the type depicted in FIG. 4: Following this type of concealment an encoding of the concealment into frames of fixed preset length that connects seamlessly with the already encoded frames that are preferably relayed via the minimal protocol action 340, cannot be guaranteed.

Therefore, an important object is to obtain concealment frames of preset length equal to the length of regular signal frames. One method of concealment with preset length is to accomplish a smooth overlap add between samples that surpass the preset frame length times the number of concealment frames with a tailing subset of samples from the frame following the concealment frames. This method is well known from the state of the art and used e.g. in International Telecommunications Union recommendation ITU-T G.711 Appendix 1. In principle, this method could also be applied when concatenation a frame with another frame, where the two frames relate to non-consecutive frames in the original audio signal. Thus, a person skilled in the art may accomplish this by obtaining a concealment frame as a continuation of the first frame and enter this concealment frame into the overlap-add procedure with the second frame, thereby partially reducing the discontinuities that originates at the boundary between the last sample of the first frame and the first sample of the second frame.

The above solutions to these scenarios are problematic. This is because of, depending on the actual waveform shape of the two signals that enter into this overlap-add procedure, a noticeable discontinuity will remain in the resulting audio signal. This discontinuity is observed by the human listener as a "bump" or a "fade" in the signal.

In the first scenario, where one or more concealment frames are involved, a re-sampling of these concealment frames have been proposed in the literature, See e.g. Valenzuela and Animalu, "A new voice-packet reconstruction technique". IEEE, 1989, for one such method. This method does not provide a solution when the objective is concatenation of two existing frames rather than concatenation with a concealment frame, further, for the concatenation of a concealment frame and a following frame, this method is still problematic. This is because a needed re-sampling to mitigate the discontinuity as perceived by a human listener may instead introduce a significant frequency distortion, i.e., a frequency shift, which is also perceived by the human listener as an annoying artifact.

SUMMARY OF THE INVENTION

The disclosed invention, or rather embodiments thereof, effectively mitigates the above-identified limitations in known solutions, as well as other unspecified deficiencies in the known solutions. According to the present invention these objects are achieved by a method, a program storage device, and an arrangement, all of which are different aspects of the present invention, having the features as defined in the appended claims.

Specifically comparing with known pitch-repetition-based methods, the disclosed invention provides techniques to concatenate signal frames, with inherent discontinuity at the frame boundaries, with significantly less perceivable artifact than what is known from the state of the art. Thereby the disclosed invention alleviates a limitation of state-of-the-art systems with directly improved perceived sound quality as a result.

The following definitions will be used throughout the present disclosure. By a "sample" is understood a sample originating from a digitized audio signal or from a signal derived thereof or coefficients or parameters representative of such signals, these coefficients or parameters being scalar or vector valued. By a "frame" is understood a set of consecutive samples, using the definition of sample above. By "subsequence" is understood a set of two or more consecutive samples, using the above definition of sample. In case of use of e.g. overlap-add, two consecutive subsequences may include overlapping samples. Depending on the choice of frames, a subsequence may extend between two consecutive frames.

The invention provides in a first aspect, a method for concatenating a first frame of samples and a subsequent second frame of samples, the method comprising applying a phase filter adapted to minimizing a discontinuity at a boundary between the first and second frames of samples.

Preferably, the phase filter is applied to at least part of samples in at least two consecutive frames. The at least two consecutive frames may be said first and second subsequent frames.

The phase filter may be applied to at least part of samples in at least the second frame and to at least part of samples in at least one frame consecutive to the second frame. The phase filter may be applied to at least part of samples in at least the second frame and to at least part of samples in at least two frames consecutive to the second frame.

The phase filter may be applied to at least part of samples in at least the first frame and to at least part of samples in at least one frame preceding the first frame. The phase filter may be applied to at least part of samples in at least the first frame and to at least part of samples in at least two frames preceding the first frame.

Preferably, the phase filter includes an all pass filter section, in simple preferred embodiments the phase filter is an all pass filter. The all pass filter section may be a parametric all pass filter section. The parametric all pass filter section preferably includes between 1 and 20 non-zero coefficients.

The phase filter may include modifying a phase of a subsequence of at least one sample by a radian phase value of pi.

In preferred embodiments, the phase filter is time-varying. The phase filter is preferably time-varying such that a response of the phase filter approximates a zero phase at a finite number of samples away from the boundary between the first and second frames, such as a finite number of samples after the boundary between the first and second frame. Preferably, the phase filter preferably has an initially selected phase response at a starting time. Said number of samples away from the boundary may depend on the initially selected phase response of the phase filter. The point in time where the response of the phase filter approximates zero phase may be within at least one of the first and second frames. Alternatively, the point in time where the response of the phase filter approximates zero phase is within a frame being at least one frame preceding the first frame. More alternatively, the point in time where the response of the phase filter approximates zero phase is within a frame being at least one frame following the second frame.

Said number of samples away from the boundary may depend on a characteristics of a subsequence of samples in the second frame or in a frame following after the second frame. E.g. in case input samples represent a speech signal, and the characteristics of such samples that may be used is to detect whether the samples represent voiced or unvoiced speech.

Said number of samples away from the boundary may depend on a characteristics of a subsequence of samples in the first frame or a frame preceding the first frame.

The phase filter may include a poly phase structure. The phase filtering may comprise an up-sampling procedure.

The method includes applying a weighted overlap-add procedure, such as a weighted overlap-add procedure including a matched filter. One part of the samples resulting from this weighted overlap add procedure is advantageously used to initialize the state of the phase filter, if another part of resulting samples from the overlap add procedure remains after this initialization, these samples are advantageously used as the first input samples of the phase filter.

At least one of the first and second frames includes one or more concealment samples may be generated by a concealment method. The concealment method may be a method that includes generating two consecutive subsequences of concealment samples based on two consecutive subsequences of buffered samples in reverse time order.

The phase filter may be based on concealment samples generated from the second frame backwards in time. An initial state of the phase filter may be based on said concealment samples. A number of samples may be included from at least one of said concealment samples is selected such as to maximize a matching measure. Said matching measure may include a correlation, such as a normalized correlation.

The method according to any of the preceding claims, wherein the sample in the first and second frames represent a digitized audio signal, such as an audio signal including a speech signal.

In advantageous embodiments of this invention, an all-pass filter, such as a parametric all-pass filter is used for phase filtering. The phase filter is made time-varying such that the further away from the frame boundary, its response is gradually closer to a zero phase. At the point where zero phase is reached, the filter is disconnected from the signal path. This point can be in a same frame where a frame boundary discontinuity was mitigated by this method, or this point can advantageously be one or several frames away from the point where the frame boundary discontinuity was mitigated. In further advantageous embodiments of this invention, the initial phase filter, the initial state of this filter, and the input to this filter are determined such as to minimize the discontinuity between last samples of a first frame and first samples of a second frame, and this minimization is accomplished by maximizing a similarity measure between a smooth continuation of said last samples in said first frame, obtained by a concealment method, and an initial part of the input, state, or output from the phase filtering of samples in said second frame. Further, in advantageous embodiments, samples representative of time before the first sample of said second frame are obtained by a concealment method working backwards in time, with the purpose to estimate input, state, and/or output from the phase filter from the first sample of the second frame and onward. In further advantageous embodiments, a weighted overlap-add procedure, and preferably a matched-filter weighted overlap-add procedure is applied between the concealment samples from said first frame and the input, state, or output from the phase filter.

In a second aspect, the invention provides a computer executable program code adapted to perform the method according to the first aspect. Such program code may be written in a machine dependent or machine independent form and in any programming language such as machine code or higher level programming language.

In a third aspect, the invention provides a program storage device comprising a sequence of instructions for a microprocessor, such as a general-purpose microprocessor, for performing the method of the first aspect. The storage device may be any type of data storage means such as disks, memory cards or memory sticks, harddisks etc.

In a fourth aspect, the invention provides an arrangement, e.g. a device or apparatus, for receiving a digitized audio signal, the arrangement including:
  memory means for storing samples representative of a received digitized audio signal, and
  processor means for performing the method of the first aspect.

Implementing this invention with adequate means, such as the ones described for the preferred embodiments below, enables a decoder and concealment system and/or a transcoder and concealment system to efficiently conceal sequences of lost or delayed packets without introducing perceptually annoying artifacts. Thereby our invention enables high quality two-way communication of audio in situations with severe clock skew, channel loss, and/or delay jitter.

BRIEF DESCRIPTION OF THE DRAWINGS

In the following the invention is described in more details with reference to the accompanying figures, of which

Figure 1:
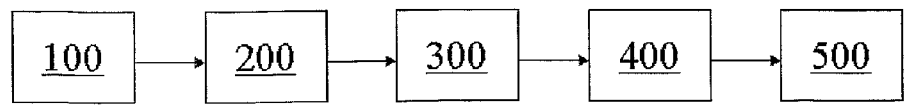
FIG. 1 is a block diagram illustrating a known end-to-end packet-switched sound transmission system subject to the effects of loss, delay, delay jitter, and/or clock skew.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF PREFERRED EMBODIMENTS

In the following, the invention is described in combination with concatenating a concealment frame and a subsequent frame. However, as will be understood from the scope of the claims, the inventive concatenation method has a much wider range of applications than that.

Figure 2:
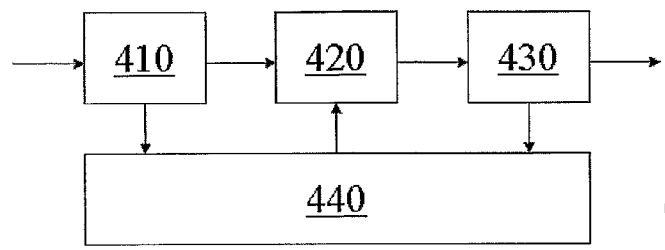
FIG. 2 is an exemplifying receiver subsystem accomplishing jitter-buffering, decoding and concealment and play-out buffering under the control of a control unit.
Figure 3:
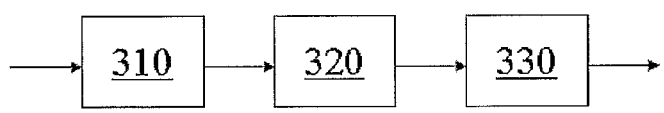
FIG. 3 is a block diagram illustrating a relay subsystem of a packet-switched channel, subject to the effects of clock skew, loss, delay, and delay jitter.
Figure 4:
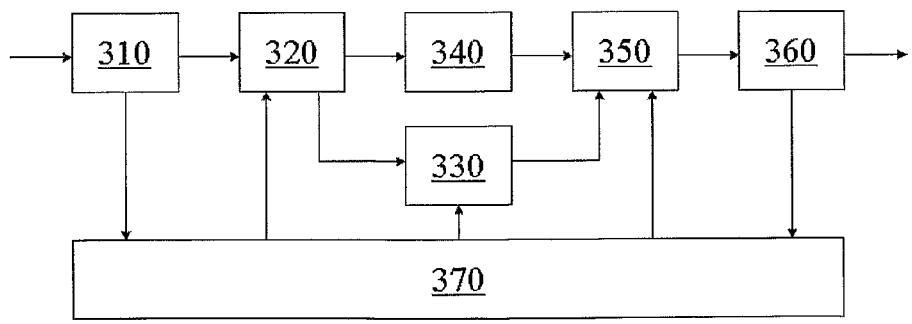
FIG. 4 is an exemplifying relay subsystem accomplishing input-buffering, output-buffering, and when necessary transcoding and concealment under the control of a control unit.

The inventive method is activated in the decoding and concealment unit 420 of a receiver such as the one in FIG. 2 or it is activated in the transcoding and concealment unit 330 of a relay such as the one in FIG. 4 or at any other location in a communication system where its action is adequate. At these locations a number of buffered signal frames are available and a number of concealment frames are wanted. The available signal frames and wanted concealment frames can consist of time-domain samples of an audio signal, e.g. a speech signal, or they can consist of samples derived thereof, such as linear prediction excitation samples, or they can consist of other coefficients derived from the audio signal and fully or partially representative of frames of sound signal. Examples of such coefficients are frequency domain coefficients, sinusoidal model coefficients, linear predictive coding coefficients, waveform interpolation coefficients, and other sets of coefficients that fully or partially are representative of the audio signal samples.

Figure 5:
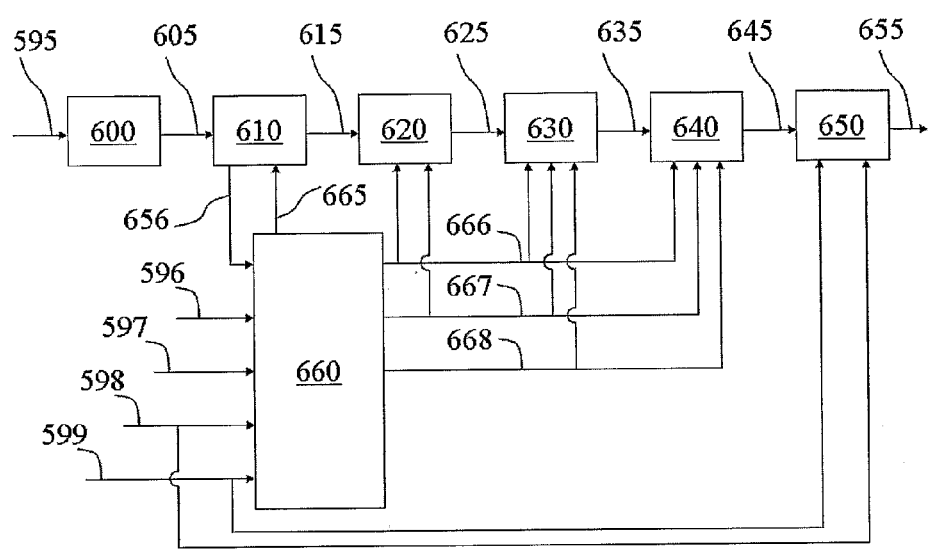
FIG. 5 is a block diagram illustrating a set of preferred embodiments of the present invention.

FIG. 5 illustrates a preferred embodiment of the invention. Following FIG. 5 the available signal frames 595, which can be received and decoded or transcoded signal frames or concealment frames from earlier operation of this or other methods to generate concealment frames or a combination of the above-mentioned types of signal frames, are stored in a frame buffer 600. The signal in the frame buffer is analyzed by an index pattern generator 660. The index pattern generator can advantageously make use of estimates of signal pitch 596 and voicing 597. Depending on the overall system design these estimates can be available for input from other processes such as an encoding, decoding, or transcoding process or they are calculated by other means preferably using state of the art methods for signal analysis. Moreover, the index pattern generator takes as input the number 598 of concealment signal frames to generate and pointers 599 to the beginning and end of the particular signal frames in the frame buffer that the concealment frame or frames are replacement for. As an example, if these buffers point to the end of the frame buffer, then this means that the concealment frame or frames should be made adequate to follow the signal stored in the frame buffer. As another example, if these pointers point out a non-empty subset of consecutive frames in the frame buffer, then this means that the concealment frame or frames should be made to replace these frames in the frame sequence representative or partially representative of the sound signal.

To illustrate this further, assume that the frame buffer 600 contains signal frames A, B, C, D, E, and that the number of concealment frames 598 is two. Then, if the pointers to frames to replace 599 points to the end of the frame buffer, this means that two concealment signal frames should be made to follow in sequence after signal frame E. Conversely, if the pointers 599 point out signal frames B, C, D, the two concealment frames should be made to replace signal frames B, C, D and to follow in sequence after signal frame A and to be followed in sequence by signal frame E.

Concerning methods to determine the number of concealment frames 598 and the subset of frames that the concealment frames should eventually replace, i.e., the pointers 599, state of the art methods should preferably be used. Thus the data 596, 597, 598, and 599 together with the signal frames 595 constitute inputs to the method device and arrangement of the present invention.

In certain overall system designs the length or dimension of a signal frame is advantageously kept as a constant during execution of the concealment unit. Among other scenarios, this is typically the case when the concealment unit is integrated in a relay system where the result of the concealment should be put into packets representative of sound signal within a time interval of preset length, this preset length being determined elsewhere. As an example, this preset length may be determined during the protocol negotiations during a call set-up in a Voice over IP system, and may be altered during the conversation in response to e.g. network congestion control mechanisms. Some embodiments of the present invention, as will become clear later, meet this requirement of working with a preset length of a signal frame in an advantageous way. However, the innovation as such is not limited to these system requirements; other embodiments of the present innovation can work with concealments that are a non-integer number of frames, and concealment frames that have time-varying lengths, and where these lengths can be functions of the specific content in the frame buffer, possibly in combination with other factors.

Embodiments of the present invention can advantageously make use of a smoothing and equalization operation 610 operating on the signal 605 from the frame buffer. This smoothing and equalization generates a signal 615 in which frames earlier in time than the concealment frame or frames have an increased similarity with the signal frame or frames that the concealment frame or frames substitute or a frame immediately before that. Alternatively, if the concealment frame or frames are inserted in sequence with the existing frames without substitution, similarity is with the frame or frames immediately before the intended position of the concealment frame or frames. For later reference, we simply term both of these cases as similarity. Similarity is as interpreted by a human listener. The smoothing and equalization obtains a signal with increased similarity, while at the same time preserving a naturally sounding evolution of the signal 615. Examples of similarity increasing operations that are advantageously performed by the smoothing and equalization 610 include increased smoothness and similarity in parameters such as energy envelope, pitch contour, voicing grade, voicing cutoff, and spectral envelope, and other perceptually important parameters.

Concerning each of these parameters, abrupt transients in evolution of the parameter within the frames to be smoothed and equalized are filtered out and the average level of the parameter in these frames is smoothly modified to become more similar in the meaning of similar defined above. Advantageously, similarity is only introduced to an extent, which still preserves a naturally sounding evolution of the signal. Under the control of the index pattern generator 660 the smoothing and equalization can advantageously mitigate transients and discontinuities that may otherwise occur in the following indexing and interpolation operation 620. Moreover, the smoothing and equalization of pitch contour can advantageously be controlled by the index pattern generator 660 in such a way as to minimize the distortion, which is eventually otherwise introduced in the concealment frames later by the phase filter 650. The smoothing and equalization operation can advantageously make use of signal or parameter substitution, mixing, interpolation and/or merging with signal frames (or parameters derived thereof) found further back in time in the frame buffer 600. The smoothing and equalization operation 610 can be left out from the system without diverging from the general scope of the present invention. In this case the signal 615 equates the signal 605 and the signal input 656 and control output 665 of the index pattern generator 660 can in that case be de omitted from the system design.

The indexing and interpolation operation 620 takes as input the, possibly smoothed and equalized, signal 615, and an index pattern 666. Furthermore, in some advantageous embodiments of the present invention the indexing and interpolation operation takes a matching quality indicator 667 as input. The matching quality indicator can be a scalar value per time instant or it can be a function of both time and frequency. The purpose of the matching quality indicator will become apparent later in this description. The index pattern 666 parameterizes the operation of the indexing and interpolation function.

Figure 5A:
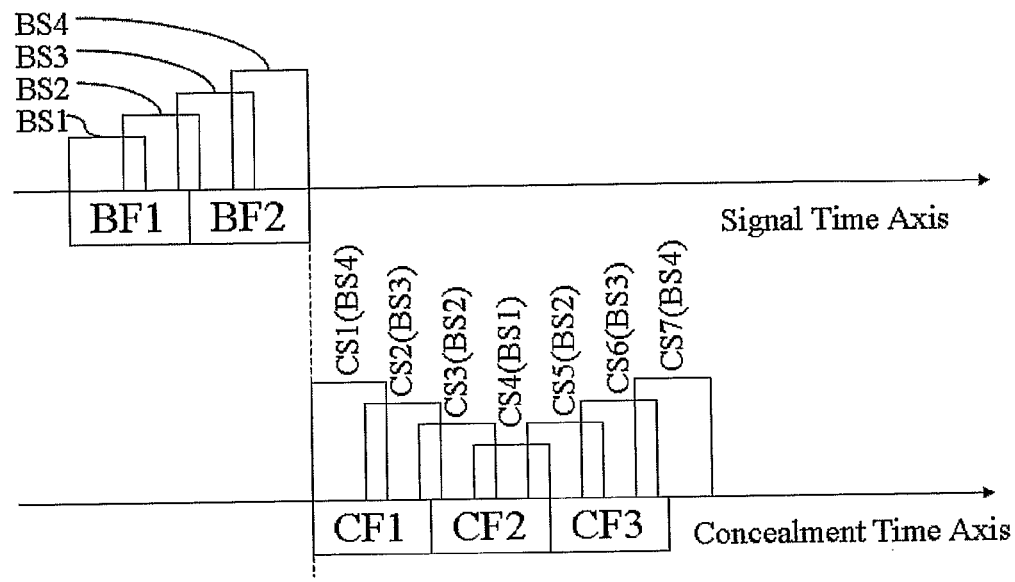
FIG. 5A is an illustrating sketch of subsequences in concealment frames starting with subsequences being based on the last buffered subsequences of in reverse time order.
Figure 5B:
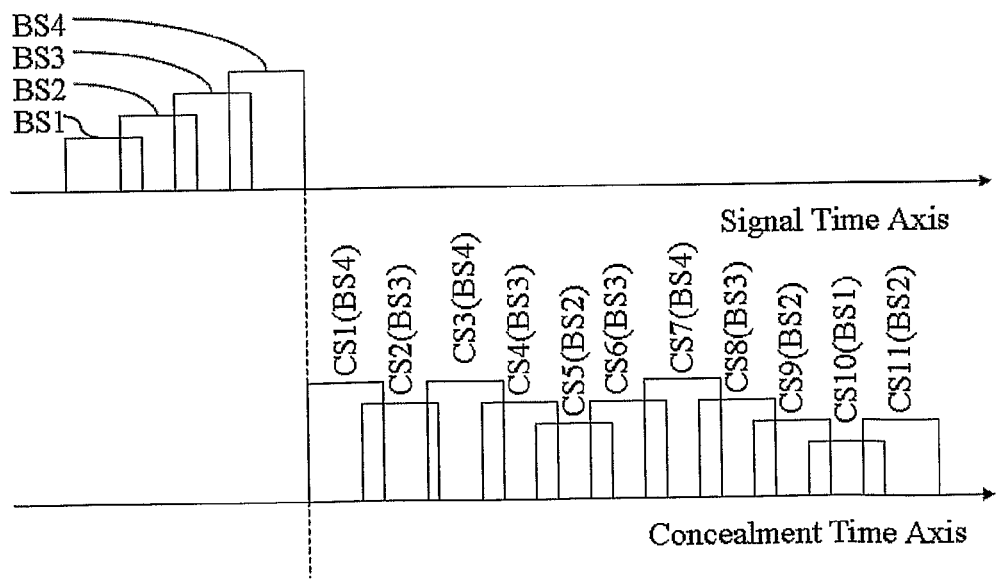
FIG. 5B illustrates another example of a larger sequence of subsequences in concealment frames starting with the last two buffered subsequences in reverse time order, and where consecutive subsequences are based on buffered subsequences further back in time.

FIG. 5A illustrates an example of how an index pattern may index subsequences in the buffered samples, BS1, BS2, BS3, BS4, gradually backwards in time in the synthesis of one or more concealment frames. In the shown example, concecutive subsequences CS1, CS2, CS3, CS, CS5, CS6, CS7 in the concealment frames CF1, CF2, CF3 are based on buffered subsequeces BS1, BS2, BS3 and BS4 of samples in frames BF1, BF2. As seen, the concealment subsequences CS1-CS7 are indexed from the buffered subsequences BS1-BS4 with a location pointer that moves gradually backwards and then gradually forwards in time as expressed by the functional notation CS1(BS4), CS2(BS3), CS3(BS2), meaning that CS1 is based on BS4, and so on. Thus, FIG. 5A serves as one example of illustrating how consecutive subsequences in concealment frames may follow each other, based on consecutive buffered subsequences but reordered in time. As seen, the first four concealment subsequences CS1(BS4), CS2(BS3), CS3 (BS2) and CS4(BS1) are chosen to be based on the last four subsequences of buffered samples BS1, BS2, BS3, BS4, in consecutive order but in reverse time order, thus starting with the last buffered subsequence BS1. After the first four subsequences in reverse time order, three subsequences CS5, CS6, CS7 follow that are all based on consecutive buffered subsequences in time order, namely BS2, BS3 and BS4, respectively. The preferred index pattern is a result of the index pattern generator 660 and may vary largely with inputs 656, 596, 597, 598, and 599 to this block. FIG. 5B gives, following the notation from FIG. 5A, another illustrative example of how concealment subsequences CS1-CS11 may be based on buffered subsequences BS1-BS4 in time reordering. As seen, later concealment subsequences are gradually based on buffered subsequences further back in time. E.g. the first two consecutive concealment subsequences CS1 and CS2 are based on the last two buffered subsequences BS3, BS4, in reverse time order, whereas a later concealment subsequence e.g. CS10 is based on BS1, i.e. a buffered subsequence further back in time than those used to calculate CS1 and CS2. Thus, FIG. 5B serves to illustrate that consecutive concealment subsequences are based on buffered subsequences indexed forwards and backwards in time in a manner so that the indexing gradually evolves backwards in time.

In advantageous embodiments of the present invention, this gradual evolution backwards in time is formalized as a sequence of what we for the purpose of this description term step backs and a sequence of what we for the purpose of this description term read lengths. In simple embodiments of this format of the index pattern, a pointer to signal samples, or parameters or coefficients representative thereof, is moved backwards by an amount equal to a first step back after which an amount of samples, or parameters or coefficients representative thereof, are inserted in the concealment frame, this amount being equal to a first read length. Thereafter the pointer is moved backwards with an amount equal to a second step back and an amount of samples, or parameters or coefficients representative thereof, equal to a second read length is read out, and so forth.

Figure 5C:
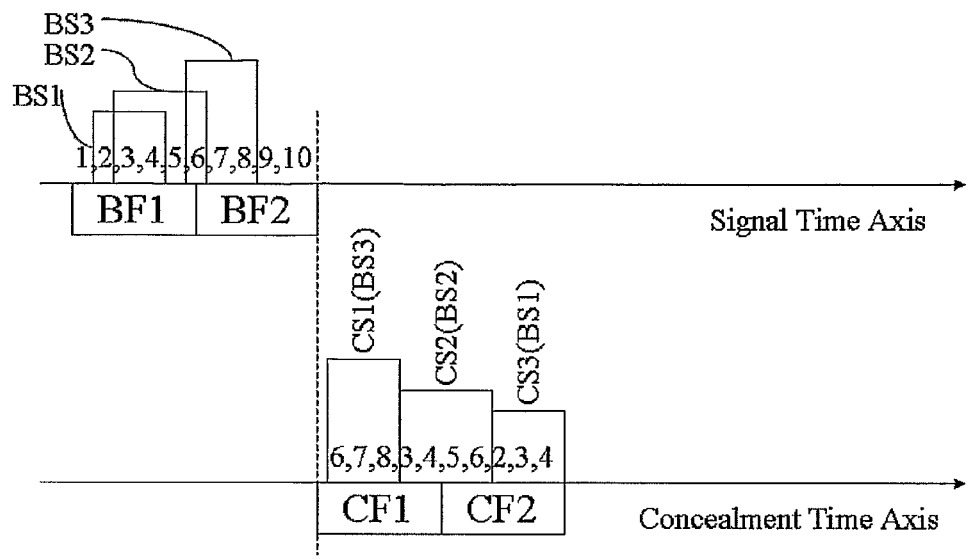
FIG. 5C illustrates the sample count indexes in an indexing pattern formatted by step backs and read lengths.

FIG. 5C illustrates an example of this process by reordering a first enumeration of indexed samples. This first enumeration is listed on the signal time axis while the enumeration list on the concealment time axis of FIG. 5C corresponds to the reordering of the original samples as they are placed in the concealment frame. For this illustrating example the first, second, and third step backs were arbitrarily chosen as 5, 6, 5, respectively, and the first, second, and third read lengths were likewise arbitrarily chosen as 3, 4, 3, respectively. In this example, the subsequences with time index sets {6,7,8}, {3,4, 5,6}, and {2,3,4}, respectively, are subsequences that evolve gradually backwards in time. The sequences of step backs and read lengths are here chosen purely for the purpose of illustration. With speech residual samples sampled at 16 kHz as an example, typical values of step backs are in the range 40 to 240, but is not limited to this range, and typical values for the read lengths are in the range of 5 to 1000 samples but is not limited to this range. In more advanced embodiments of this format, the transition from a forward directed sequence (e.g. original time or an indexed subsequence back in time) to another forward directed sequence, one step further back in time, is made gradually by a gradually shifting interpolation.

Figure 6:
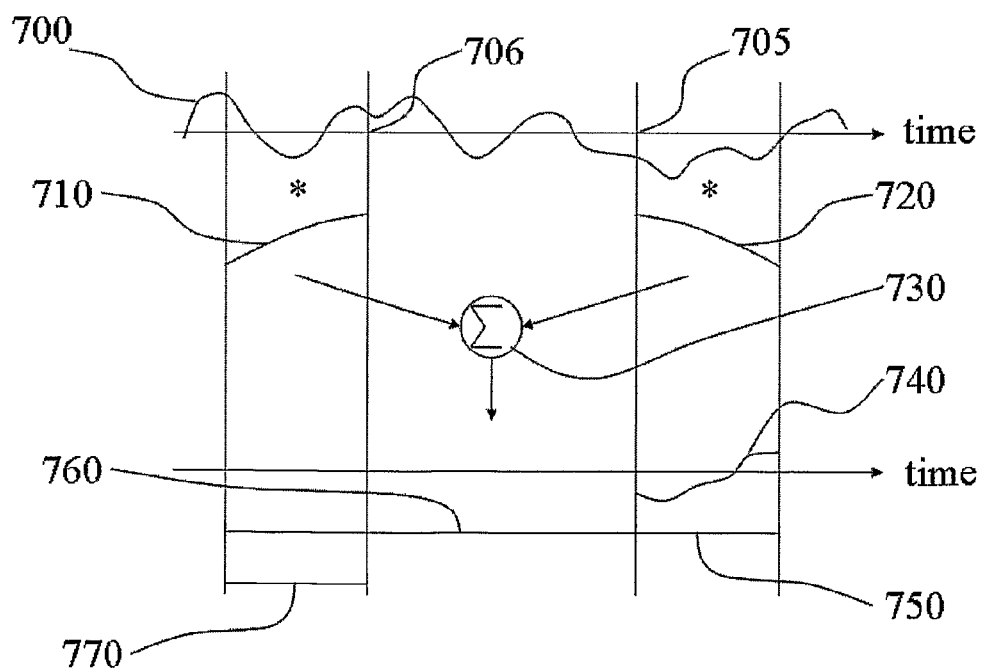
FIG. 6 is an illustrating sketch of signals involved in the indexing and interpolation function.

FIG. 6 illustrates the operation of a simple embodiment of the indexing and interpolation function in response to one step back and a corresponding read length and matching quality indicator. For the purpose of illustration only, signal frames here consist of time domain audio samples. The gradually shifting interpolation applies on the general definition of "sample" used in this description, i.e. including scalar or vector valued coefficients or parameters representative of the time domain audio samples, in a similar and thereby straightforward manner. In this FIG. 700 illustrates a segment of the signal 615. The pointer 705 is the sample time instant following the sample time instant of the last generated sample in the indexing and interpolation output signal 625. The time interval 750 has a length equal to the read length. The time interval 770 also has a length equal to the read length. The time interval 760 has a length equal to the step back. The signal samples in 700 starting from time 705 and read length forward in time are one by one multiplied with a windowing function 720. Also the signal samples in 700 starting at a location one sample after step back before the location 706 and read length samples ahead from there are one by one multiplied with a windowing function 710. The resulting samples from multiplying with window 710 and with window

720 are added one by one 730 to result in the samples 740 that constitute a new batch of samples for the output 625 from the indexing and interpolation operation. Upon completion of this operation the pointer 705 moves to the location 706.

In simple embodiments of the present invention the window functions 710 and 720 are simple functions of the read length 750. One such simple function is to choose the window 710 and the window 720 as the first and second half, respectively, of a Hanning window of length two times read length. Whereas a wide range of functions can be chosen here, observe that for such functions to be meaningful in the context of the present invention, they must accomplish a weighted interpolation between the samples in the segment indicated by 750 and the samples indicated by 770 in such a way that we gradually, but not necessarily monotonically, move from a high weight on the segment indicated by 750 to a high weight on the segment indicated by 770.

In other embodiments of the present invention the window functions 710 and 720 are functions of the matching quality indicator. A simple example of such a function is that, depending on a threshold on normalized correlation on the segments of the signal 700 indicated by time intervals 750 and 770, an interpolation operation is chosen to either sum to unity in amplitudes or in powers. Another example of such function avoids the constraint to sum up amplitudes or powers to one, but instead optimize window weights as a function of the matching measure only. Further refinement of this method takes the actual value of the normalized correlation and optimizes the interpolation operation in response to it, e.g. using classical linear estimation methods. However, examples of preferred methods are described in the following. In these examples the threshold, respectively the actual value of normalized correlation give examples of advantageous information conveyed by the matching quality indicator 667. According to preferred embodiments described in the following, the interpolation operation can be made to implement different weightings at different frequencies. In this case the matching quality indicator 667 can advantageously convey measures of matching as a function of frequency. In advantageous embodiments this weighting as a function of frequency is implemented as a tapped delay line or other parametric filter form that can be optimized to maximize the matching criterion.

In FIG. 6 an illustration is given of the operation of indexing and interpolation when the signal 615 (and therefore the signal segment 700) contain samples that are representative of time-domain samples of a sound signal or of a time-domain signal derived thereof. As mentioned above, samples in frames 595 and thereby in signals 605 and 615 can advantageously be such that each sample is a vector (vector valued samples) where such a vector contains coefficients or parameters, which are representative or partially representative of the sound signal. Examples of such coefficients are line spectral frequencies, frequency domain coefficients, or coefficients defining a sinusoidal signal model, such as sets of amplitudes, frequencies, and phases. With a basis in this detailed description of preferred embodiments of the present invention, the design of interpolation operations that are advantageously applied to vector valued samples is feasible to a person skilled in the art, as the remaining details can be found described in the general literature for each of the specific cases of such vector valued samples.

It is advantageous for the understanding of the present invention to observe that when the indexing and interpolation operation is applied repeatedly with a read length that is smaller than the step back, then the result will be that the samples in the signal 625 become representative of signal samples that are gradually further and further back in the signal 615. When then the step back and or read length is changed such that the read length becomes larger than the step back, then this process will turn and samples in the signal 625 now becomes representative of signal samples that are gradually further and further forward in the signal 615. By advantageous choice of the sequence of step backs and the sequence of read lengths a long concealment signal with rich and natural variation can be obtained without calling for samples ahead in time from the latest received signal frame in the frame buffer 600 or even without calling for samples ahead of another preset time instant, which can be located earlier than the latest sample in the latest received frame in the frame buffer 600. Thereby concealment of delay spikes in a system with low-delay playout or output-buffer scheduling becomes possible with the present invention. In the formulation of the present description the simple strict backwards temporal evolution of the signal, which can be useful to think of as an element in a simple embodiment of the present invention, is realized by repeated use of a read length of one sample, a step back of two samples and a window 720 comprising of a single sample of value 0 and a window 710 comprising of a single sample of value 1.0.

The primary object of the index pattern generator 660 is to control the action of the indexing and interpolation operation 620. In a set of preferred embodiments this control is formalized in and indexing pattern 666, which can consist of a sequence of step backs and a sequence of read lengths. This control can be further augmented with a sequence of matching quality indications, which in turn each can be functions e.g. of frequency. An additional feature, which can be output from the index pattern generator, and which use will become clear later in this description is a repetition count 668. The meaning of repetition count is the number of times that an evolution backwards in time is initiated in the construction of the concealment frame or frames. The index pattern generator obtains these sequences from a basis in information, which can comprise the smoothed and equalized signal 656 output from the smoothing and equalization operation 610; a pitch estimate 596 a voicing estimate 597 a number 598 of concealment frames to generate and pointers 599 to the frames to replace. In one embodiment of the index pattern generator it will enter different modes depending on the voicing indicator. Such modes are exemplified below.

As an example advantageously used in the linear predictive excitation domain, if the voicing indicator robustly indicates that the signal is unvoiced speech or that no active speech is present in the signal, i.e., the signal consists of background noise, the index pattern generator can enter a mode in which a simple reversion of the temporal evolution of the signal samples is initiated. As described earlier this can be accomplished e.g. by submitting a sequence of step back values equal to two and a sequence of read length values equal to one (this description is based in the design choice that the indexing and interpolation operation will itself identify these values and apply the adequate windowing function as described above). In some cases this sequence can continue until a reverse temporal evolution of the signal has been implemented for half of the number of new samples needed in the concealment frame or frames, after which the values in the step back sequence can change to 0, whereby a forward temporal evolution of the signal is commenced, and continue until the pointer 706 is effectively back at the point of departure for the pointer 705 in the first application of the step back. However, this simple procedure will not always be sufficient for high quality concealment frames. An important task of the index pattern generator is the monitoring of adequate stopping criteria. In the above example, the reverse temporal evolution may bring the pointer 706 back to a position in the signal at which the sound, as interpreted by a human listener, is significantly different from the starting point. Before this occurs the temporal evolution should be turned.

Preferred embodiments of the present invention can apply a set of stopping criteria based in a set of measures. The following exemplifies a few of these measures and stopping criteria. If the voicing indicates that the signal at the pointer 706 is voiced, then in the above example starting from unvoiced, the temporal evolution direction can advantageously be turned, also if the signal energy in an area round the pointer 706 is different (as determined by an absolute or relative threshold) from the signal energy at the point of departure for the pointer 705, the temporal evolution direction can advantageously be turned. As a third example the spectral difference between a region around the point of departure for the pointer 705 and the current position of the pointer 706 may exceed a threshold and the temporal evolution direction should be turned.

A second example of a mode can be evoked when the signal cannot robustly be determined as unvoiced or containing no active speech. In this mode the pitch estimate 596 constitutes a basis for determining the index pattern. One procedure to do this is that each step back is searched to give a maximized normalized correlation between the signal from pointer 705 and one pitch cycle ahead in time and the signal from a point that is step back earlier than the pointer 705 and one pitch cycle ahead. The search for potential values of step back can advantageously be constrained to a region. This region can advantageously be set to plus minus 10 percent round the previously found step back or the pitch lag if no previous step back has been found. Once the step back has been determined the value of read length will determine if the temporal signal evolution should evolve backwards or forwards in time, and how fast this evolution should take place. A slow evolution is obtained by a choice of read length close to the identified value of step back. A fast evolution is obtained by a choice of read length that is much smaller or much larger than the step back in the case of backwards and forwards evolution, respectively. An objective of the index pattern generator is to select the read length to optimize the sound quality as interpreted by a human listener. Selecting the read length too close to the step back can in some signals, such as signals that are not sufficiently periodic, result in perceptually annoying artefacts such as string sounds. Selecting the read length too far from the step back, implies that a larger time interval in the frame buffer is ultimately swept through during the temporal evolution of the concealment frame or frames, alternatively that the direction of temporal evolution has to be turned more times before sufficient amount of samples for the concealment frame or frames have been generated.

The first case can in some signals, such as signals that are not sufficiently stationary (alternatively not sufficiently smooth and equalized), result in a kind of perceptually annoying artefacts that has certain resemblance with a stuttering in the sound of the concealment frame or frames. In the second case string-sound-like artefacts may occur. A feature of advantageous embodiments of the present invention is that the read length can be determined as a function of the step back and the normalized correlation, which is optimized in the search for the optimum step back. One simple, yet advantageous, choice of this function in embodiments of the present invention working on speech signals and when signal frames contain 20 ms of linear predictive excitation signal sampled at 16 kHz, is as an example given by the following function ReadLength=[(0.2+NormalizedCorrelation/3)*StepBack]

Where square brakets [ ] are used to indicate rounding to nearest integer and where symbols ReadLength, NormalizedCorrelation, and StepBack are used to denote the read length the normalized correlation obtained for the optimum step back and the corresponding step back, respectively. The above function is included only as an example to convey one advantageous choice in some embodiments of the present invention. Any choice of read length including any functional relation to obtain this read length are possible without diverging from the spirit of the present invention. In particular, advantageous methods to select the read length include the use of control 665 to parameterize the smoothing and equalization operation 610 such as to reach a joint minimization of stutter-like and string sound-like artefacts in an intermediate concealment frame 625. This explains why the index pattern generator 660 takes the intermediate signal 656 as input rather than the output 615 from the smoothing and equalization operation: the signal 656 represents potential versions of the final signal 615 under the control 665, and enables the index pattern generator to approach the optimization task by means of iterations. As is the case for the unvoiced and non-active speech mode above, the stopping criteria are essential in this mode too. All the examples of stopping criteria put forward in the mode above apply to this mode as well. Additionally, in this mode stopping criteria from measuring on the pitch and normalized correlation can advantageously be part of embodiments of the present invention.

Figure 7:
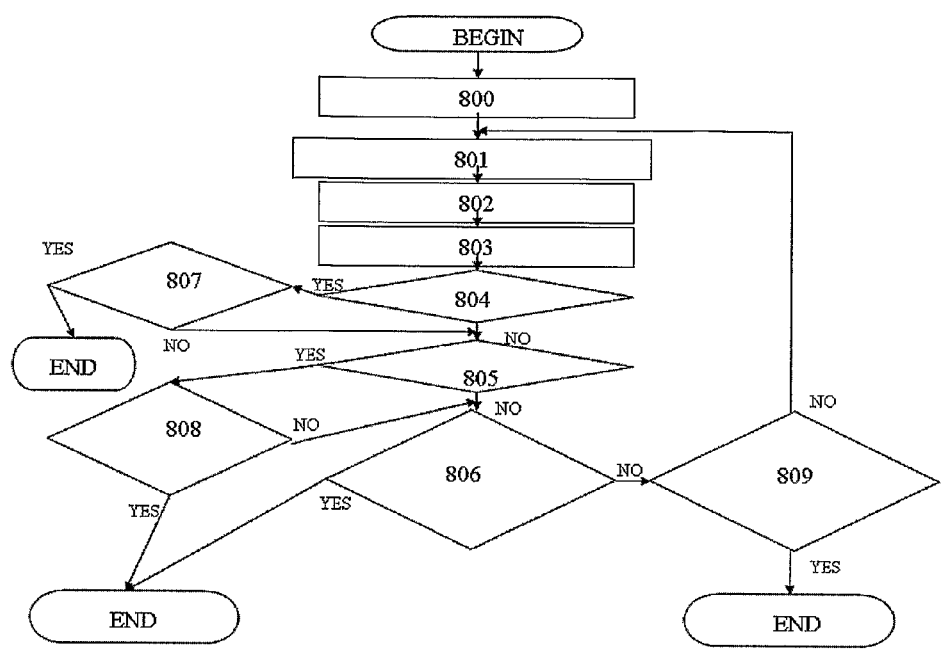
FIG. 7 is a flow chart illustrating one possible way to implement a decision-logic for stopping criteria.

FIG. 7 illustrates, as an example, an advantageous decision logic for a combination of stopping criteria. In FIG. 7, the reference signs indicate the following:

800: Identify if signal is high correlation type, low correlation type or none of these. Determine initial energy level
   801: Determine next step back and normalized correlation and read length
   802: Determine if signal has entered low correlation type
   803: Determine if signal has entered high correlation type
   804: Is signal high correlation type?
   805: Is signal low correlation type?
   806: Is energy below relative minimum threshold or above relative maximum threshold?
   807: Is normalized correlation below threshold for high correlation type?
   808: Is normalized correlation above threshold for low correlation type?
   809: Has enough samples been generated?

In the case of operation in the linear predictive excitation domain of speech sampled at 16 kHz. The thresholds addressed in FIG. 7 can advantageously be chosen as follows: high correlation type can be entered when a normalized correlation greater than 0.8 is encountered; a threshold for remaining in high correlation type can be set to 0.5 in normalized correlation; low correlation type can be entered when a normalized correlation lower than 0.5 is encountered; a threshold for remaining in low correlation type can be set to 0.8 in normalized correlation; a minimum relative energy can be set to 0.3; and a maximum relative energy can be set to 3.0. Furthermore, other logics can be used and other stopping criteria can be used in the context of the present invention without diverging from the spirit and scope of the present invention.

The application of stopping criteria means that a single evolution, backwards in time until either enough samples are generated or a stopping criterion is met and then forward in time again, is not guaranteed to give the needed number of samples for the concealment frames. Therefore, more evolutions, backwards and forwards in time, can be applied by the index pattern generator. However, too many evolutions back and forth may in some signals create string-sound-like artefacts. Therefore, preferable embodiments of the present invention can jointly optimize the stopping criteria, the function applied in calculation of the read lengths, the smoothing and equalization control 665, and the number of evolutions back and forth, i.e., the repetition count 668, and if enabled by the pointers to the frames to replace 599, also the number of samples that we evolve forward in time before each new evolution backwards in time is initiated. To this end, the smoothing and equalization operation can also advantageously be controlled so as to slightly modify the pitch contour of the signal. Furthermore, the joint optimization can take into account the operation of the phase filter 650, and make slight changes to the pitch contour such as to result in an index pattern that minimize the distortion introduced in the phase filter jointly with the other parameters mentioned above. With a basis in the description of preferred embodiments for the present invention, a person skilled in the art understands that a variety of general optimization tools apply to this task, these tools include Iterative optimization, Markov decision processes, Viterbi methods, and others. Any of which are applicable to this task without diverging from the scope of the present invention.

Figure 8:
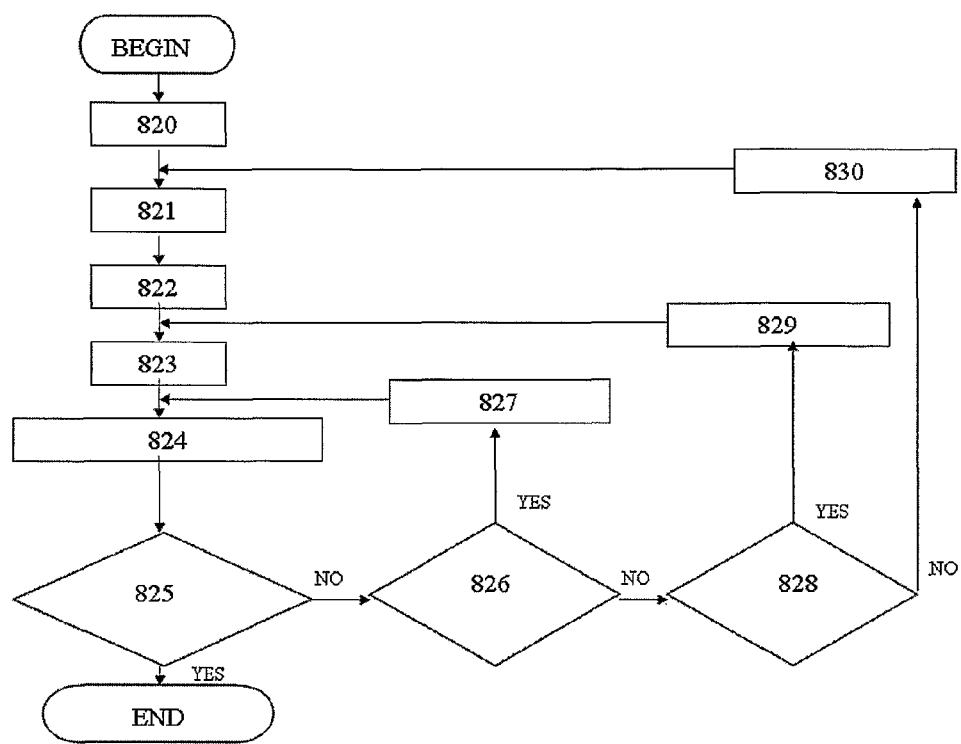
FIG. 8 is a flow chart illustrating one possible way to accomplish an iterative joint optimization of smoothing and equalization, stopping criteria and the number of allowed repetitions.

FIG. 8 illustrates by means of a flow graph one example of an iterative procedure to accomplish a simple, yet efficient, optimization of these parameters. In FIG. 8, the reference signs indicate the following:

820: Initiate controls for smoothing and equalization 665
821: Obtain new smooth signal 656
822: Initiate stopping criteria
823: Initiate the allowed number of repetitions
824: Identify the index pattern for a sequence of backwards and forwards evolutions evenly distributed over the available frames indicated by pointers 599 or if pointing to end of available frames, evolutions backwards following directly after evolutions forwards
825: Is the sufficient amount of samples for the number of concealment frames 598 generated?
826: Is the maximum number of repetitions reached?
827: Augment allowed number of repetitions
828: Is the loosest threshold for stopping criteria reached?
829: Loosen the thresholds for stopping criteria
830: Change controls to increase the impact of smoothing and equalization Note that one evolution backwards and forwards in time and a following evolution backwards and forwards in time, in the case enough signal had not been synthesized in the previous evolution or evolutions backwards and forwards in time, can advantageously differ. As examples, the sequences of step backs, read lengths, and interpolation functions, and also the end location pointer after evolution backwards and forwards in time should be devised such as to minimize periodicity artefacts otherwise resulting from a repetition of similar index patterns. With voiced speech residual domain samples at 16 kHz as an example, one evolution backwards and forwards in time, generating approximately, say, 320 samples, can preferably end approximately 100 samples further back in the signal than an earlier evolution backwards and forwards in time.

The disclosed embodiments up to this point efficiently mitigates the problems of artificially sounding string sounds known from prior art methods, while at the same time enable efficient concealment of abrupt delay jitter spikes and abruptly occurring repeated packet losses. However, in adverse network conditions, as encountered e.g. in some wireless systems and wireless ad hoc networks and best effort networks and other transmission scenarios, even the disclosed method may in some cases introduce slight components of tonality in the concealment frames. A minor noise mixing operation 630 and a graceful attenuation filter 640 can therefore advantageously be applied in some embodiments of the present invention. The general techniques of noise mixing and attenuation are well known to a person skilled in the art. This includes the advantageous use of frequency dependent temporal evolution of the power of the noise component and frequency dependent temporal evolution of the attenuation function. A feature specific to the use of noise mixing and attenuation in the context of the present invention is the explicit use of the index pattern 666, the matching quality measure 667 and/or the repetition count 668 for adaptive parameterization of the noise mixing and attenuation operations. Specifically, the indexing pattern indexes where unaltered signal samples are placed in the concealment frame and where the samples of the concealment frame is a result of an interpolation operation. Moreover, the ratio of step back relative to read length in combination with the matching quality measure are indicative of the perceptual quality resulting from the interpolation operation. Thus little or no noise can advantageously be mixed into the original samples, more noise can advantageously be mixed into the samples that are results of an interpolation process and the amount of noise mixed into these samples can advantageously be a function of the matching quality measure, advantageously in a frequency differentiated manner. Furthermore, the value of the read length relative to the step back is also indicative of the amount of periodicity that may occur, the noise mixing can advantageously include this measure in the determination of amount of noise to mix into the concealment signal. The same principle applies to the attenuation; a graceful attenuation is advantageously used, but less attenuation can be introduced for samples that are representative of original signal samples and more attenuation can be introduced for samples that result from the interpolation operation. Furthermore, the amount of attenuation in these samples can advantageously be a function of the matching quality indication and advantageously in a frequency differentiated manner. Again, the value of the read length relative to the step back is indicative of the amount of periodicity that may occur; the attenuation operation can advantageously include this measure in the design of the attenuation.

As addressed in the background for the present invention, an important object of a subset of embodiments of the present invention obtains concealment frames of preset length equal to the length of regular signal frames. When this is wanted from a system perspective, the means to this end can advantageously be a phase filter 650. A computationally simple, approximate but often sufficient operation of this block is to accomplish a smooth overlap add between samples that surpass the preset frame length times the number of concealment frames with a tailing subset of samples from the frame following the concealment frames. Seen isolated, this method is well known from the state of the art and used e.g. in International Telecommunications Union recommendation ITU-T G.711 Appendix 1. When practical from a system perspective the simple overlap-add procedure can be improved by a multiplication of subsequent frames with −1 whenever this augments the correlation in the overlap-add region. However, other methods can advantageously be used, e.g. in the transition between voiced signal frames, to mitigate further the effect of discontinuities at the frame boundaries. One such method is a re-sampling of the concealment frames. Seen as an isolated method, this too is well known from the state of the art. See e.g. Valenzuela and Animalu, "A new voice-packet reconstruction technique", IEEE, 1989. Thus, mitigating discontinuities at frame boundaries may be performed by a person skilled in the art. However, in preferred embodiments of the invention disclosed herewith, the re-sampling can advantageously be continued into the frames following the last concealment frame. Hereby the slope of temporal change and thereby the frequency shift, which is a consequence of the re-sampling technique, can be made imperceptible when interpreted by a human listener. Further, rather than re-sampling, the use of time-varying all-pass filters to mitigate discontinuities at frame boundaries is disclosed with the present invention. One embodiment of this, is as given by the filter equation $$H\_L(z,t)=(alpha\_1(t)+alpha\_2(t)*z\textasciicircum(-L))/(alpha\_2(t)+alpha\_1(t)*z\textasciicircum(-L))$$

The function of which is explained as follows. Suppose that a sweep from a delay of L samples to a delay of 0 samples is wanted over a sweep interval, which can include all or part of the samples in all or part of the concealment frames; in frames before the concealment frames; and in frames after the concealment frames. Then in the beginning of the sweep interval alpha_1(t) is set to zero and alpha_2(t) it set to 1.0 so as to implement a delay of L samples. As the sweep over t starts, alpha_1(t) should gradually increase towards 0.5 and alpha_2(t) should gradually decrease towards 0.5. When, in the end of the sweep interval alpha_1(t) equates alpha_2(t) the filter H_L(z,t) introduce a delay of zero. Conversely if a sweep from a delay of zero samples to a delay of L samples is wanted over a sweep interval, which can include all or part of the samples in all or part of the concealment frames; in frames before the concealment frames; and in frames after the concealment frames. Then in the beginning of the sweep interval alpha_1(t) is set to 0.5 and alpha_2(t) it set to 0.5 so as to implement a delay of 0 samples. As the sweep over t starts, alpha_1(t) should gradually decrease towards 0 and alpha_2(t) should gradually increase towards 1.0. When, in the end of the sweep interval alpha_1(t) equates 0 and alpha_2(t) equates 1.0 the filter H_L(z,t) introduce a delay of L samples.

The above filtering is computationally simple, however it has a non-linear phase response. For perceptual reasons, this non-linear phase limits its use to relatively small L. Advantageously L<10 for speech at a sample rate of 16 kHz. One method to accomplish the filtering for larger values of initial L is to initiate several filters for smaller L values that sums up to the desired total L value, these several filters can advantageously be initiated at different instants of time and sweep their range of alpha's over different intervals of time. One other method to increase the range of L in which this filter is applicable is disclosed in the following. A structure that implements a functionally same filtering as the one above is to divide the signal into L poly-phases and conduct the following filtering in each of these poly-phases $$H\_1(z,t)=(alpha\_1(t)+alpha\_2(t)*z\textasciicircum(-1))/(alpha\_2(t)+alpha\_1(t)*z\textasciicircum(-1))$$

By the present invention the poly-phase filtering is advantageously implemented by use of up-sampling. One way to do this advantageously is to up-sample each poly-phase with a factor K and conduct the filtering H_1(z,t) K times in each up-sampled poly phase before down-sampling with a factor K and reconstruction of the phase modified signal from the poly-phases. The factor K can advantageously be chosen as K=2. By the up-sampling procedure, a phase response, which is closer to linear, is obtained. Hereby the perceived quality as interpreted by a human listener is improved.

The above described phase adjustment over multiple frames is applicable when concealment frames are inserted in a sequence of received frames without loss. It is also applicable when frames are taken out of the signal sequence in order to reduce playback delay of subsequent frames. And it is applicable when frames are lost and zero or more concealment frames are inserted between the received frames before and the received frames after the loss. In these cases, an advantageous method to get the input signal for this filter and find the delay L is as follows:

1) on the frames earlier in time than the discontinuity point, a concealment method, the one disclosed herewith or any other, is continued or initiated.
2) on the frames later in time than the discontinuity a number L_test samples are inserted in the frame start by a concealment method, the one disclosed herewith or any other, but with an reversed indexing of the time samples.
3) a matching measure, such as normalized correlation, is applied between the concealment frame or frames form 1) and the frame or frames from 2) including the heading L_test samples.
4) the L_test that maximizes the matching measure is selected as L.
5) the concealment frame or frames from 2) and the frame or frames from 3) are now added together using a weighted overlap-add procedure. Whereas this weighted overlap-add can be performed as known by a person skilled in the art, it can preferably be optimized in as disclosed later in this description.
6) the resulting frame or frames are used as input to the above described phase fitting filtering, initiated with the determined value L. If L is larger than a threshold, then several filters are initiated and coefficient swept at different time instants and time intervals, with their L-values summing up to the determined value L.

Advantageously, in speech or speech residual sampled at 8 or 16 kHz, the above threshold can be chosen to a value in the range 5 to 50. Further advantageously, in voiced speech or voiced speech residual, the concealment samples L_test and its continuation into the following frame are obtained by circular shifting the samples of the first pitch period of the frame. Thereby a correlation measure without normalization, correlating the full pitch period, can advantageously be used as matching measure to find the preferred circular shift L.

Figure 9:
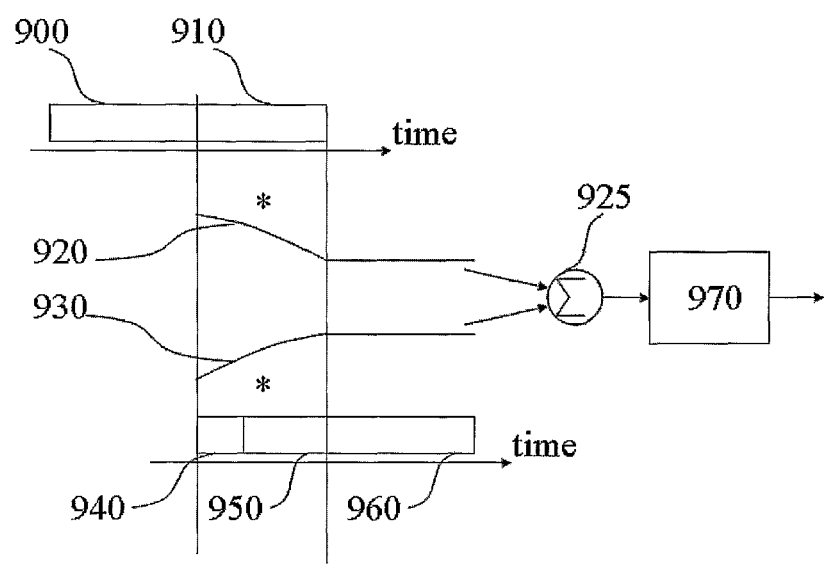
FIG. 9 illustrates the use of circular shift and overlap-add in connection with initializing and feeding a phase adjusting filter.

FIG. 9 illustrates one embodiment of such method. In this figure, the phase adjustment creates a smooth transition between a signal frame 900 and the following frames. This is accomplished as follows: From the signal frame 900 and earlier frames, a concealment signal 910 is generated. This concealment signal can be generated using the methods disclosed herewith, or by using other methods that are well known from the state of the art. The concealment signal is multiplied with a window 920 and added 925 with another window 930, which is multiplied with a signal generated as follows: A concealment signal 940 is generated, from following samples 950 and possibly 960, by effectively applying a concealment method such as the ones disclosed herewith, or using other methods that are well known from the state of the art, and concatenated with the following samples 950. The number of samples in the concealment 940 is optimized such as to maximize the matching between the concealment 910 and the concatenation of 940 and the following samples 950.

Advantageously, normalized correlation can be used as a measure of this matching. Further, to reduce computational complexity, the matching can for voiced speech or voiced speech residual be limited to comprise one pitch period. In this case the concealment samples 940 can be obtained as a first part of a circular shift of one pitch period, and the correlation measure over one pitch period now need not be normalized. Hereby computations for calculation of the normalization factor are avoided. As for the indexing and interpolation operation described earlier in this detailed description of preferred embodiments, the windows can again advantageously be a function of a matching quality indicator and/or a function of frequency and advantageously implemented as a tapped delay line. The operation of the filter 970 is as follows. The first L samples resulting from the overlap-add procedure are passed directly to its output, and used to set up the initial state of the filter. Thereafter the filter coefficients are initialized as described above, and as the filter filters from sample L+1 and forwards these coefficients are adjusted gradually, such as to gradually remove the L samples of delay, as disclosed above.

Again, in the above described procedure, the method of optimizing the weights of the windows according to maximizing the matching criterion, as described above, applies, and also the generalization of the window functions to frequency dependent weights and to matched filters in the form of tapped delay lines or other parametric filter forms. In advantageous embodiments the temporal evolution of the frequency dependent filter weight is obtained by a sequence of three overlap-add sequences, first fades down the concealment frame or frames from earlier frames, second fades up a filtered version of these with a filter such as to match the concealment frames from later frames obtained in reverse indexed time, then fades this down again, third fades up the frame or frames later in time. In another set of advantageous embodiments the temporal evolution of the frequency dependent filter weight is obtained by a sequence of four overlap-add sequences, first fades down the concealment frame or frames from earlier frames, second fades up a filtered version of these with a filter such as to match the concealment frames from later frames obtained in reverse indexed time, then fades this down again, third fades up a filtered version of the frames later in time, such as to further improve this match, and fades that down again, and finally fourth window fades up the frame or frames later in time. Further advantageous embodiments of weighted overlap-add methods are disclosed later in this description.

Concerning the smoothing and equalization operation 610 in embodiments where residual-domain samples are used as a part of the information representative for the speech signal, smoothing and equalization can advantageously be applied on this residual signal using pitch adapted filtering, such as a comb filter or a periodic notch filter. Furthermore, Wiener or Kalman filtering with a long-term correlation filter plus noise as a model for the unfiltered residual can advantageously be applied. In this way of applying the Wiener or Kalman filter, the variance of the noise in the model applies to adjust the amount of smoothing and equalization. This is a somewhat counterintuitive use, as this component is traditionally in Wiener and Kalman filtering theory applied to model the existence of an unwanted noise component. When applied in the present innovation the purpose is to set the level of smoothing and equalization. As an alternative to pitch adapted comb or notch filtering and Wiener or Kalman type filtering, a third method is advantageously applied for smoothing and equalization of residual signals in the context of the present innovation. By this third method, either sample amplitudes, as advantageously applied e.g. for unvoiced speech, or consecutive vectors of samples, as advantageously applied e.g for voiced speech, are made increasingly similar. Possible procedures for accomplishing this are outlined below for vectors of voiced speech and samples of unvoiced speech, respectively.

For voiced speech, consecutive samples of speech or residual are gathered in vectors with a number of samples in each vector equal to one pitch period. For convenience of description we here denote this vector as v(k). Now, the method obtains a remainder vector r(k) as a component of v(k) that could not by some means be found in surrounding vectors v(k−L1), v(k−L1+1), . . . , v(k−1) and v(k+1), v(k+2), . . . , v(k+L2). For convenience of description, the component found in surrounding vectors is denoted a(k). The remainder vector r(k) is subsequently manipulated in some linear or non-linear manner so as to reduce its audibility, while preserving naturalness of the resulting reconstructed vector, which is obtained by reinserting the component a(k) in the manipulated version of r(k).

This leads to the smoothed and equalized version of voiced speech or voiced residual speech. One simple embodiment of the above described principle, using for convenience matrix-vector notation and for simplicity of example the notion of linear combining and least-squares to define a(k) is given below. This merely serves as one example of a single simple embodiment of the above general principle for smoothing and equalization.

For the purpose of this example, let the matrix M(k) be defined as $$M(k)=[v(k-L1)\ v(k-L1+1)\ldots v(k-1)\ v(k+1)\\ v(k+2)\ldots V(k+L2)]$$

From which a(k) can be calculated e.g. as the least-squares estimate of v(k) given M(k)

$$a(k)=M(k)\ \mathrm{inv}(\mathrm{trans}(M(k))\ M(k))\ v(k)$$

where inv( ) denotes matrix inversion or pseudo inversion and trans( ) denotes matrix transposition. Now the remainder r(k) can be calculated e.g. by subtraction.

$$r(k)=v(k)-a(k)$$

One example of manipulating r(k) is by clipping away peaks in this vector, e.g., such as to limit the maximum absolute value of a sample to a level equal to the maximum amplitude of the r(k) vector closest to the starting point of the backward-forward concealment procedure, or to some factor times the amplitude of the sample at the same position in vector but in the vector closest to the starting point of the backward-forward concealment procedure. The manipulated remainder rm(k) is subsequently combined with the a(k) vector to reconstruct the equalized version of v(k), for convenience here denoted by ve(k). This combination can as one example be accomplished by simple addition:

$$ve(k)=\mathrm{alpha}*rm(k)+a(k)$$

The parameter alpha in this example can be set to 1.0 or can advantageously be selected to be smaller than 1.0, one advantageous choice for alpha is 0.8.

For unvoiced speech, another smoothing and equalization method can with advantage be used. One example of smoothing and equalization for unvoiced speech calculates a polynomial fit to amplitudes of residual signal in logarithmic domain. As an example, a second order polynomial and in log10 domain can be used. After converting the polynomial fit from logarithmic domain back to linear domain, the fitting curve is advantageously normalized to 1.0 at the point that corresponds to the starting point for the backward-forward procedure. Subsequently, the fitting curve is lower-limited, e.g., to 0.5, where after the amplitudes of the residual signal can be divided with the fitting curve such as to smoothly equalize out the variations in amplitude of the unvoiced residual signal.

Concerning weighted overlap-add procedures, some but not all applications of which are disclosed earlier in this description, i.e., the indexing and interpolation operation 620 and the method to initiate the input signal for the phase adjustment filtering 970, procedures may be performed as known by a person skilled in the art. However, in preferred embodiments of weighted overlap-add procedures, the methods disclosed in the following may advantageously used.

In a simple embodiment of a weighted overlap-add procedure modified in response to a matching quality indicator, we consider a first window multiplied with a first subsequence and a second window multiplied with a second subsequence, and these two products enter into an overlap-add operation. Now, as an example, we let the first window be a taper-down window, such as a monotonically decreasing function, and we let the second window be a taper-up window, such as a monotonically increasing function. Secondly, for the purpose of a simple example, we let the second window be parameterized by a basic window shape times a scalar multiplier. We now define: target as said first subsequence; w_target as said first subsequence sample-by-sample multiplied with said taper-down window; w_regressor as said second subsequence sample-by-sample multiplied with said basic window shape for the taper-up window; and coef as said scalar multiplier. Now the scalar multiplier component of the second window can be optimized such as to minimize a summed squared error between target and the result of the overlap-add operation. Using for convenience a matrix-vector notation, the problem can be formulated as minimizing the summed-squared difference between target and the quantity $$w\_target + w\_regressor * coef$$

Defining from here vectors T and H as $$T = target - w\_target$$

$$H = w\_regressor$$

The solution to this optimization is given as $$coef = inv(trans(H)*H)*trans(H)*T$$

In which inv( ) denotes scalar or matrix inversion, trans( ) denotes the transpose of a matrix or vector and * is matrix or vector multiplication. Now, as central components in the inventions disclosed herewith, this method can be expanded to optimize the actual shape of a window. One way to obtain this is as follows. We define a set of shapes for which the wanted window is obtained as a linear combination of elements in this set. We now define H such that each column of H is a shape from this set sample by sample multiplied with said second subsequence, and we define coef as a column vector containing the unknown weights of these shapes in the optimized window function. With these definitions, the above equations formulating the problem and its solution, now applies to solving for a more general window shape. Naturally, the role of the first and the second window can be interchanged in the above, such that it is now the first window for which optimization takes place.

A more advanced embodiment of the present invention jointly optimizes both window shapes. This is made by defining a second set of basic window shapes, possibly equivalent with the first set of window shapes, and advantageously selected as a time reversed indexing of the samples in each of the window shapes in the first set of window shapes. Now define the w_target as a matrix in which each column is a basic window shape from said second set of window shapes sample by sample multiplied with the first subsequence and define coef as a column vector containing first the weights for the first window and second the weights for the second window. Then the more general problem can be formulated as minimizing the summed-squared difference between the target and the quantity $$[w\_target\ w\_regressor]*coef$$

where square brackets [ ] are used to form a matrix from sub-matrices or vectors. Now, defining from here vectors T and H as $$T = target$$

$$H = [w\_target\ w\_regressor]$$

The solution to this optimization is given as $$coef = inv(trans(H)*H)*trans(H)*T$$

Further, a more advanced embodiment of the present invention optimizes not only instantaneous window shapes but windows with an optimized frequency dependent weighting. One embodiment of this invention applies the form of a tapped delay line, though the general invention is by no means limited to this form. One way to accomplish this generalization is to replace, in the definition of w_target and w_regressor above, each column with a number of columns each sample by sample multiplying with the basic window shape corresponding to the column they replace but where this basic window shape is now sample by sample multiplied with the relevant subsequence delayed corresponding to a specific position in a tapped delay line.

Advantageously, optimizations of coefficients in these methods take into account a weighting, constraint, or sequential calculation of the coefficients without deferring from the invention disclosed herewith. Such weightings may advantageously include weighting towards more weight on coefficients corresponding to low absolute delay values. Such sequential calculation may advantageously calculate coefficients for low absolute delay values first, such as to minimize the sum of squared error using those coefficients only, and then subsequently repeating this process for increasing delay values but only on the remaining error from the earlier steps in this process.

In general, embodiments of this invention take several subsequences as targets of the optimization. The optimization in general terms minimize a distortion function, which is a function of these target subsequences and the output from the weighted overlap-add system. This optimization may without diverging from the present invention, apply various constraints on the selection of basic shapes and delays and their weighting in the overall overlap-add. Depending on the exact selection of shapes, the effect of the overlap-add is advantageously faded out gradually from subsequences following the overlap-add region in time.

Figure 10:
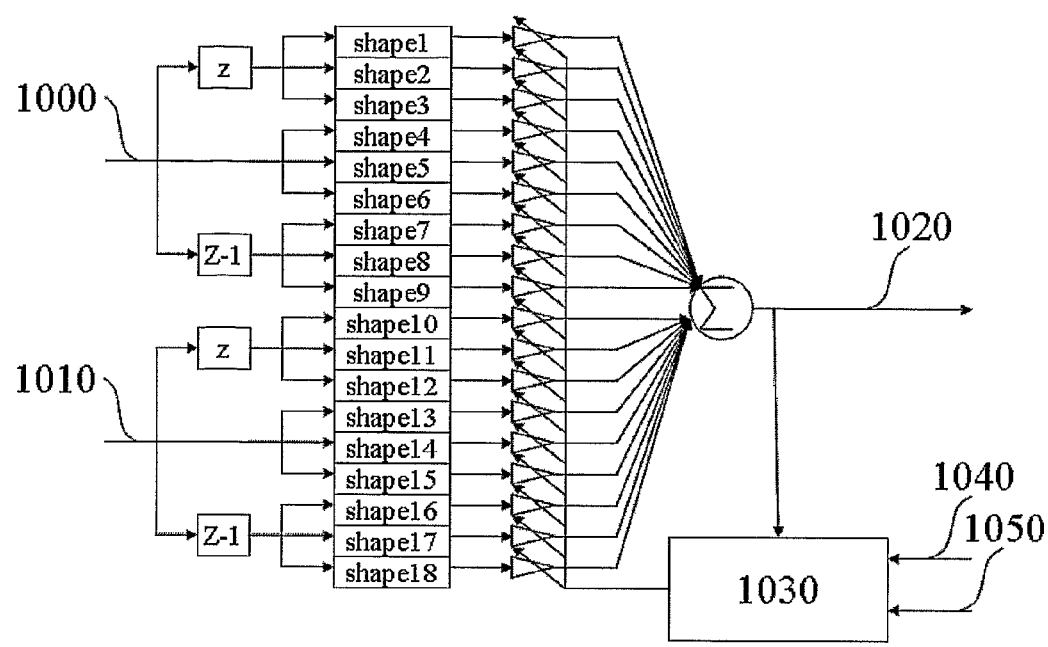
FIG. 10 illustrates one embodiment of the disclosed weighted overlap-add procedure.

FIG. 10 illustrates one embodiment of the disclosed overlap-add method. This figure is only for the purpose of illustrating one embodiment of this invention, as the invention is not limited to the exact structure in this figure. In FIG. 10, one subsequence 1000 enters the time and frequency shape optimized overlap-add with another subsequence 1010. Each of these subsequences enters a separate delay line, where in the figure, z designates a time advance of one sample and z−1 designates a time delay of one sample, and where the selected delays of 1, −1, and 0 are purely for the purpose of illustration: other, more and less, delays can advantageously be used in connection with the present invention. Each delayed version of each subsequence is now multiplied with a number of base window shapes, and the result of each of these are multiplied with a coefficient to be found jointly with the other coefficients in the course of the optimization. After multiplication with these coefficients the resulting subsequences are summed to yield the output 1020 from the time and frequency shape optimized overlap-add. The optimization 1030 of coefficients takes, in the example of FIG. 10, subsequences 1040 and 1050 as input, and minimize a distortion function, which is a function of 1040 and 1050 and the output 1020.

In the claims reference signs to the figures are included for clarity reasons only. These references to exemplary embodiments in the figures should not in any way be construed as limiting the scope of the claims.

The invention claimed is:

1. A method for concatenating a first frame of samples and a subsequent second frame of samples in a digitized audio signal in a receiver, the method comprising:
   receiving the signal comprising the first frame of samples and the subsequent second frame of samples;
   generating concealment samples from the subsequent second frame of samples of the digitized audio signal;
   placing the concealment samples in the signal such that the second frame follows the concealment samples;
   initializing a parametric all pass filter in the receiver based on said concealment samples, thereby initializing filter coefficients of the parametric all pass filter; and
   concurrently applying the parametric all pass filter to at least part of samples in at least two consecutive frames, so as to minimize a discontinuity at a boundary between the first and second frames of samples.

2. A method according to claim 1, wherein the at least two consecutive frames are said first and second subsequent frames.

3. A method according to claim 2, wherein the parametric all pass filter is applied to at least part of the samples in at least the second frame and to at least part of samples in at least two frames consecutive to the second frame.

4. A method according to claim 1, wherein the parametric all pass filter is applied to at least part of the samples in at least the second frame and to at least part of samples in at least one frame consecutive to the second frame.

5. A method according to claim 1, wherein the parametric all pass filter is applied to at least part of the samples in at least the first frame and to at least part of samples in at least one frame preceding the first frame.

6. A method according to claim 5, wherein the parametric all pass filter is applied to at least part of the samples in at least the first frame and to at least part of samples in at least two frames preceding the first frame.

7. A method according to claim 1, wherein the parametric all pass filter includes modifying a phase of a subsequence of at least one sample by a radian phase value of pi.

8. A method according to claim 1, wherein the parametric all pass filter includes between 1 and 20 non-zero coefficients.

9. A method according to claim 1, wherein the parametric all pass filter is time-varying.

10. A method according to claim 9, wherein the parametric all pass filter is time-varying such that a response of the parametric all pass filter approximates a zero phase at a finite number of samples away from the boundary between the first and second frames.

11. A method according to claim 10, wherein the parametric all pass filter has an initially selected phase response at a starting time.

12. A method according to claim 11, wherein said number of samples away from the boundary depends on the initially selected phase response of the parametric all pass filter.

13. A method according to claim 10, wherein the point in time where the response of the parametric all pass filter approximates zero phase is within at least one of the first and second frames.

14. A method according to claim 10, wherein the point in time where the response of the parametric all pass filter approximates zero phase is within a frame being at least one frame preceding the first frame.

15. A method according to claim 10, wherein the point in time where the response of the parametric all pass filter approximates zero phase is within a frame being at least one frame following the second frame.

16. A method according to claim 10, wherein the said number of samples away from the boundary depends on the characteristics of a subsequence of samples in the second frame or in a frame following after the second frame.

17. A method according to claim 10, wherein the said number of samples away from the boundary depends on the characteristics of a subsequence of samples in the first frame or a frame preceding the first frame.

18. A method according to claim 1, wherein the parametric all pass filter includes a poly phase structure.

19. A method according to claim 1, wherein the method further comprises performing an up-sampling.

20. A method according to claim 1, wherein a number of samples included from at least one of said concealment samples is selected to maximize a matching measure.

21. A method according to claim 20, wherein the matching measure includes a correlation.

22. A method according to claim 21, wherein the correlation is a normalized correlation.

23. One or more computer-readable storage memories comprising instructions for concatenating a first frame of samples and a subsequent second frame of samples in a digitized audio signal in a receiver, the instructions executable by one or more processors to perform operations comprising:
   receiving the signal comprising the first frame of samples and the subsequent second frame of samples;
   generating concealment samples from the subsequent second frame of samples of the digitized audio signal;
   placing the concealment samples in the signal such that the second frame follows the concealment samples;
   initializing a parametric all pass filter in the receiver based on said concealment samples, thereby initializing filter coefficients of the parametric all pass filter; and
   concurrently applying the parametric all pass filter to at least part of samples in at least two consecutive frames, so as to minimize a discontinuity at a boundary between the first and second frames of samples.

24. The one or more computer-readable storage memories according to claim 23, wherein the at least two consecutive frames are said first an second subsequent frames.

25. A receiver device for concatenating a first frame of samples and a subsequent second frame of samples in a digitized audio signal comprising:
   a processor;
   one or more memories, coupled to the processor, comprising instructions executable by the processor to perform operations comprising:
      receiving the signal comprising the first frame of samples and the subsequent second frame of samples;
      generating concealment samples from the subsequent second frame of samples of the digitized audio signal;
      placing the concealment samples in the signal such that the second frame follows the concealment samples;

initializing a parametric all pass filter in the receiver based on said concealment samples, thereby initializing filter coefficients of the parametric all pass filter; and concurrently applying the parametric all pass filter to at least part of samples in at least two consecutive frames, so as to minimize a discontinuity at a boundary between the first and second frames of samples.

26. A device according to claim 25, wherein the processor is a general purpose microprocessor.

27. A device according to claim 25, wherein the at least two consecutive frames are said first and second subsequent frames.

* * * * *